United States Patent [19]
Green et al.

[11] Patent Number: 5,404,563
[45] Date of Patent: Apr. 4, 1995

[54] SCHEDULING NORMALLY INTERCHANGEABLE FACILITIES IN MULTIPROCESSOR COMPUTER SYSTEMS

[75] Inventors: Lucina L. Green, Verbank; Peter H. Gum, Poughkeepsie; Roger E. Hough; Sandra L. Rankin, Stormville, all of N.Y.; Stephen J. Schmandt, Tokyo, Japan; Ronald M. Smith, Sr., Wappingers Falls, N.Y.; Vincent A. Spano, Poughkeepsie, N.Y.; Phil C. Yeh, Poughkeepsie, N.Y.; Devon S. Yu, Poughkeepsie, N.Y.

[73] Assignee: International Business Machines Corporation, Armonk, N.Y.

[21] Appl. No.: 181,379

[22] Filed: Jan. 14, 1994

Related U.S. Application Data

[63] Continuation of Ser. No. 751,470, Aug. 28, 1991, abandoned.

[51] Int. Cl.6 .......................... G06F 9/00; G06F 11/20
[52] U.S. Cl. ..................................... 395/800; 395/325; 395/650; 364/DIG. 1; 364/DIG. 2; 364/281.3; 364/154; 364/187; 371/9.1; 371/11.3
[58] Field of Search ...................... 395/800, 325, 650; 364/184, 187; 371/9.1, 11.3

[56] References Cited
U.S. PATENT DOCUMENTS

| | | | |
|---|---|---|---|
| 4,218,738 | 8/1980 | Matyas et al. | 340/149 |
| 4,503,535 | 3/1985 | Budde et al. | 371/11.3 |
| 4,674,038 | 6/1987 | Brelsford | 395/575 |
| 4,797,884 | 1/1989 | Yalowitz et al. | 371/9.1 |
| 4,809,157 | 2/1989 | Eilert et al. | 395/275 |
| 4,843,541 | 6/1989 | Bean et al. | 395/275 |
| 5,134,700 | 7/1992 | Eyer et al. | 395/425 |
| 5,214,652 | 5/1993 | Sutton | 371/9.1 |

Primary Examiner—Robert B. Harrell
Assistant Examiner—Timothy L. Philipp
Attorney, Agent, or Firm—Sterne, Kessler, Goldstein & Fox

[57] ABSTRACT

A system and method for dispatching logical central processing units (CPUs) among physical CPUs in a multiprocessor computer system having multiple logical partitions, wherein the cryptographic facilities may not be interchangeable. According to the present invention, the logical CPUs are dispatched among the physical CPUs according to either an affinity, floating, or disabled scheduling method. The affinity scheduling method is used when the crypto facilities are not interchangeable or when non-interchangeable crypto functions are performed. The floating scheduling method is used when the cryptographic facilities are interchangeable and interchangeable crypto functions are performed. The disabled scheduling method is used when the logical CPU is not authorized to issue cryptographic instructions.

42 Claims, 12 Drawing Sheets

SCHEDULING NORMALLY INTERCHANGEABLE FACILITIES IN MULTIPROCESSOR COMPUTER SYSTEMS

This application is a continuation of application Ser. No. 07/751,470, filed Aug. 28, 1991, now abandoned.

TECHNICAL FIELD

The present invention relates generally to scheduling similar physical components to tasks in multiprocessor computer systems, wherein the physical components are normally, but not always, interchangeable. More specifically, the present invention relates to scheduling cryptographic facilities to logical central processing units in a multiprocessor computer system having multiple logical partitions, wherein the cryptographic facilities are normally, but not always, interchangeable.

BACKGROUND ART

FIG. 1A illustrates a computer system 102 having physical hardware components 104. The physical hardware components 104 include a shared memory 110. The physical hardware components 104 also include physical central processing units (CPU) 106 and cryptographic facilities (CF) 108. Each cryptographic facility has a manual-control panel 109 attached to it. In this patent document, the terms "cryptographic" and "crypto" are used interchangeably.

The computer system 102 also includes a hypervisor 112. The hypervisor 112 is an operating system which establishes multiple logical partitions 114.

The logical partitions 114 each contains logical hardware components 124. The logical hardware components 124 include logical CPUs 116. The hypervisor 112 schedules, or allocates, the physical hardware components 104 to the logical partitions 114. For example, during a particular time-slice, the hypervisor 112 may allocate the physical CPU 106A to operate with the logical partition 114A. Specifically, the hypervisor 112 may dispatch the logical CPU 116B on the physical CPU 106A. In other words, the logical CPU 116B is a guest CPU of the physical CPU 106A.

Correspondingly, the physical CPU 106A is a host CPU of the logical CPU 116B. Note that the hypervisor 112 views the logical CPUs 116 as tasks. In this patent document, the terms "guest CPU" and "guest" are used interchangeably. Also, the terms "host CPU" and "host" are used interchangeably.

Each of the logical partitions 114 also includes an operating system (OS) 118 and a cryptographic subsystem (CS) 120. While FIG. 1A illustrates that the logical partitions 114 include distinct OSs 118 and CSs 120, such illustration is for conceptualization purposes only.

Multiple application programs 122 operate on the logical partitions 114. The OS 118 schedules, or allocates, the logical hardware components 124 to the application programs 122. For example, during a particular time-slice, the OS 118A may allocate the logical CPU 116A to operate with the application program 122C. Note that the OS 118 views the application programs 122 as tasks.

The CS 120 and CFs 108 perform cryptographic functions, such as data encryption and data decryption. As shown in FIG. 1A, the physical CPUs 106A and 106B are coupled to the CFs 108A and 108B, respectively. Thus, the physical CPUs 106A, 106B can process both crypto and non-crypto instructions. The physical CPUs 106C, 106D, 106E, 106F are not coupled to the CFs 108. Thus, the physical CPUs 106C, 106D, 106E, 106F cannot process crypto instructions.

Because the physical CPUs 106C, 106D, 106E, 106F cannot process crypto instructions, the hypervisor 112 must redispatch the logical CPUs 116A, 116B, 116D, and 116E operating on the physical CPUs 106C, 106D, 106E, 106F to the physical CPUs 106A, 106B when the logical CPUs 116A, 116B, 116D, and 116E issue crypto instructions.

The hypervisor 112 may encounter various problems when redispatching the logical CPUs 116A, 116B, 116D, and 116E from the physical CPUs 106C, 106D, 106E, 106F to the physical CPUs 106A, 106B.

A first problem involves interchangeability among the CFs 108. Specifically, the CFs 108 sometimes may be not interchangeable. The CFs 108 are not interchangeable when they do not operate identically. Conversely, the CFs 108 are interchangeable when they operate identically.

In addition, there are a number of cryptographic functions, called non-interchangeable functions, that are required to be performed on a specific CF 108, independent of whether all CFs 108 are interchangeable. Other cryptographic functions are called interchangeable functions.

Most non-interchangeable functions are manual-key-entry functions. They must be performed on a specific CF 108 because they communicate with an external agent through the manual-control panel 109. Also, execution of these functions may change the state (or contents) of the CF 108 and cause the CF 108 to become non-interchangeable. Other non-interchangeable functions are either sense-type functions that are normally used to determine if CFs 108 are interchangeable or change-type functions that alter the CF contents (or interchangeability).

While the CFs 108 are interchangeable, and for guest interchangeable crypto functions, the hypervisor 112 may dispatch the logical CPUs 116A, 116B, 116D, and 116E (which are issuing crypto instructions) to any of the physical CPUs 106A, 106B which are coupled to the CFs 108A, 108B.

When the CFs 108 are not interchangeable or when the guest performs non-interchangeable functions, however, errors may result if the hypervisor 112 dispatches the logical CPUs 116A, 116B, 116D, and 116E to any of the physical CPUs 106A, 106B.

As an example, the manual-key-entry process involves interaction with a program. When a security officer is entering cryptographic keys through the manual-control panel 109B, the program must be running on a logical CPU 116 which is assigned to the physical CPU 106B that is connected to the manual-control panel 109B. If the hypervisor 112 dispatches the logical CPU 116 to the physical CPU 106A during the process, the program, which uses non-interchangeable functions, will not be able to import the key entered by the officer.

Although presented in a cryptographic context, the above problem exists whenever the hypervisor 112 is dispatching tasks (such as the logical CPUs 116) among similar physical components (such as the CFs 108) which are, at times, not interchangeable, or whenever the hypervisor 112 is dispatching a task which is issuing non-interchangeable functions, which must be performed on a specific CPU 106.

A second problem involves the hypervisor's 112 need to access data retained in the CFs 108A, 108B. Specifically, in order to determine whether the CFs 108A, 108B are interchangeable, the hypervisor 112 must have access to this retained data in the CFs 108A, 108B. Also, the hypervisor 112 must have access to the retained data in the CFs 108A, 108B when the hypervisor 112 is saving and restoring processing states of the logical CPUs 116. However, the hypervisor 112 must not be able to obtain the value of the retained data since the retained data is secret. Therefore, a problem exists since security may be breached in order to allow the hypervisor 112 to perform its functions.

Therefore, a system and method for dispatching logical CPUs among physical CPUs in a multiprocessor computer system having multiple logical partitions, wherein the cryptographic facilities may not be interchangeable, are required. More generally, a system and method for dispatching tasks among similar physical components in a multiprocessor computer system, wherein the physical components may not be interchangeable, are required.

DISCLOSURE OF INVENTION

The present invention is directed to a system and method for dispatching logical CPUs among physical CPUs in a multiprocessor computer system having multiple logical partitions, wherein the cryptographic facilities may not be interchangeable. More generally, the present invention is directed to a system and method for dispatching tasks among similar physical components in a multiprocessor computer system, wherein the physical components may not be interchangeable.

According to the present invention, the logical CPUs are dispatched among the physical CPUs according to a scheduling method. According to the scheduling method of the present invention, either a disabled, affinity or floating scheduling method is active at any time to dispatch a logical CPU among physical CPUs.

While the disabled scheduling method is active for a logical CPU, the logical CPU is disabled for crypto instructions. Thus, the logical CPU can be dispatched to any available physical CPU.

According to the affinity scheduling method, each logical CPU with crypto is assigned to a physical CPU which is coupled to a cryptographic facility. The assigned physical CPUs are called home CPUs. While the affinity scheduling method is active for a logical CPU, the logical CPU is dispatched on its home CPU and is enabled for crypto instructions.

While the floating scheduling method is active for a logical CPU with crypto, the cryptographic facilities must be interchangeable and the logical CPU is dispatched to any CPU with crypto and is enabled for interchangeable crypto instructions.

The present invention also includes a system and method for determining whether cryptographic facilities are interchangeable. According to the present invention, a hypervisor does not need to obtain the values of data retained in the cryptographic facilities in order to determine whether the cryptographic facilities are interchangeable.

The foregoing and other objects, features and advantages of the invention will be apparent from the following more particular description of preferred embodiments of the invention, as illustrated in the accompanying drawings. In the drawings, like reference numbers indicate identical or functionally similar elements.

BRIEF DESCRIPTION OF DRAWINGS

The present invention will be described with reference to the accompanying drawings, wherein.

BEST MODE FOR CARRYING OUT THE INVENTION

1. Overview

Figure 1A:
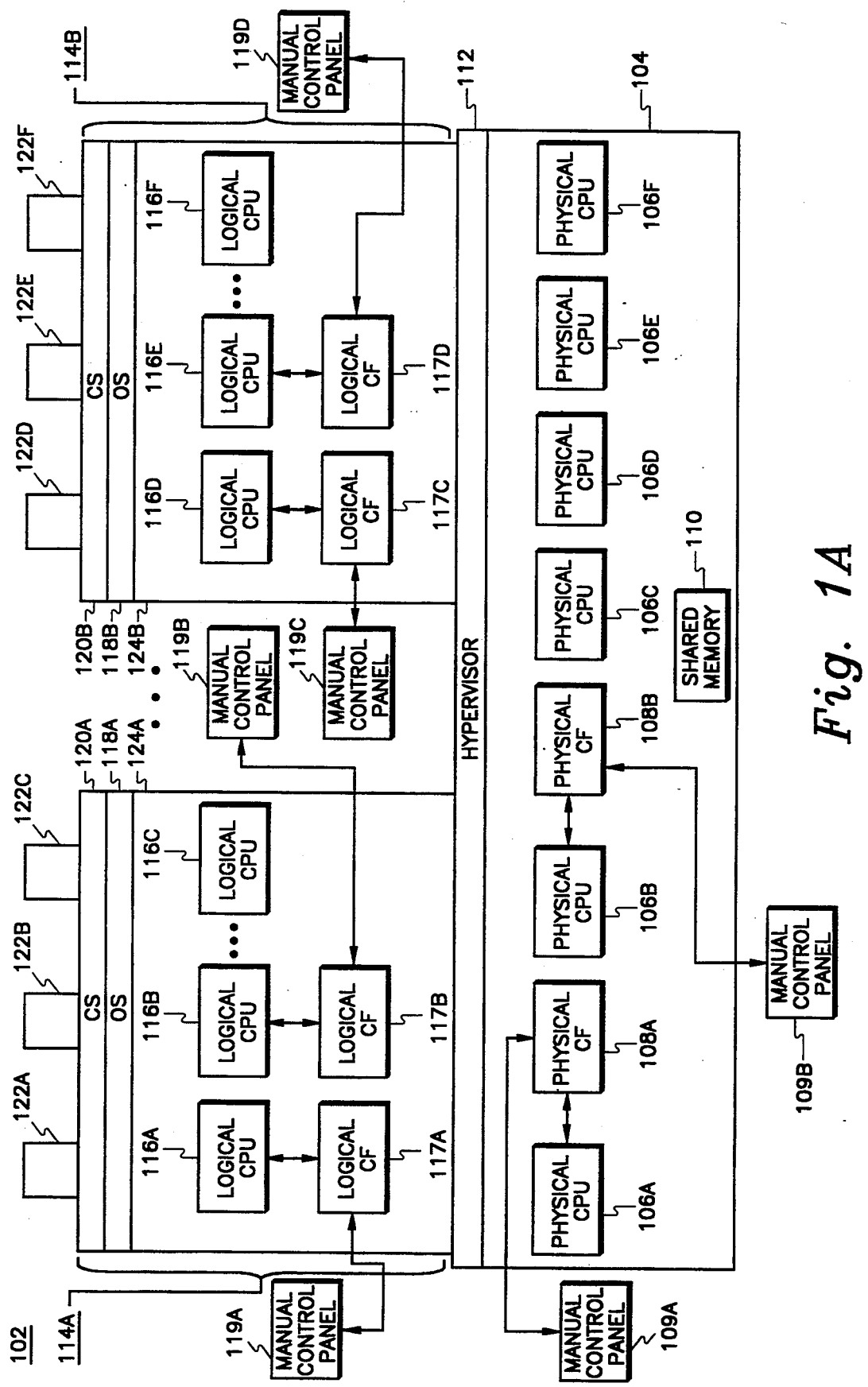
FIG. 1A illustrates a computer system 102 according to the present invention.

The present invention represents a computer system 102 as shown in FIG. 1A. According to the present invention, however, the computer system 102 includes structural and operational improvements. These structural and operational improvements enable the present invention to dispatch logical CPUs 116 among physical CPUs, wherein the cryptographic facilities 108 may or may not be interchangeable. These structural and operational improvements are described in detail below.

In a preferred embodiment of the present invention, the computer system 102 is an International Business Machines Corporation (IBM) ES/9000 model 900.

In the preferred embodiment of the present invention, the hardware components 104 include six physical CPUs 106 and two CFs 108. However, the principles described herein are applicable for different amounts of physical CPUs 106 and CFs 108.

In the preferred embodiment of the present invention, the hypervisor 112 is a processor resources/system manager (PR/SM). The PR/SM is generally described in U.S. Pat. No. 4,809,157 to Eilert et al. and U.S. Pat. No. 4,843,541 to Bean et al., both which are incorporated herein by reference in their entireties.

The hypervisor 112 establishes multiple logical partitions 114. In the preferred embodiment of the present invention, up to seven logical partitions 114 may be established.

In the preferred embodiment of the present invention, the CS 120 is an IBM Integrated Cryptographic Service Facility/Multiple Virtual Systems. The OS 118 is an IBM Multiple Virtual Systems/Special Product (MVS/SP) Version 3, Release 1.3.

The general structure and operation of the CS 120 and CFs 108 are well known to those skilled in the art.

2. Structural and Operational Improvements of the Present Invention

This section describes structural and operational improvements of the computer system 102 according to the present invention.

2.1. Manual Control Panel

Figure 2:
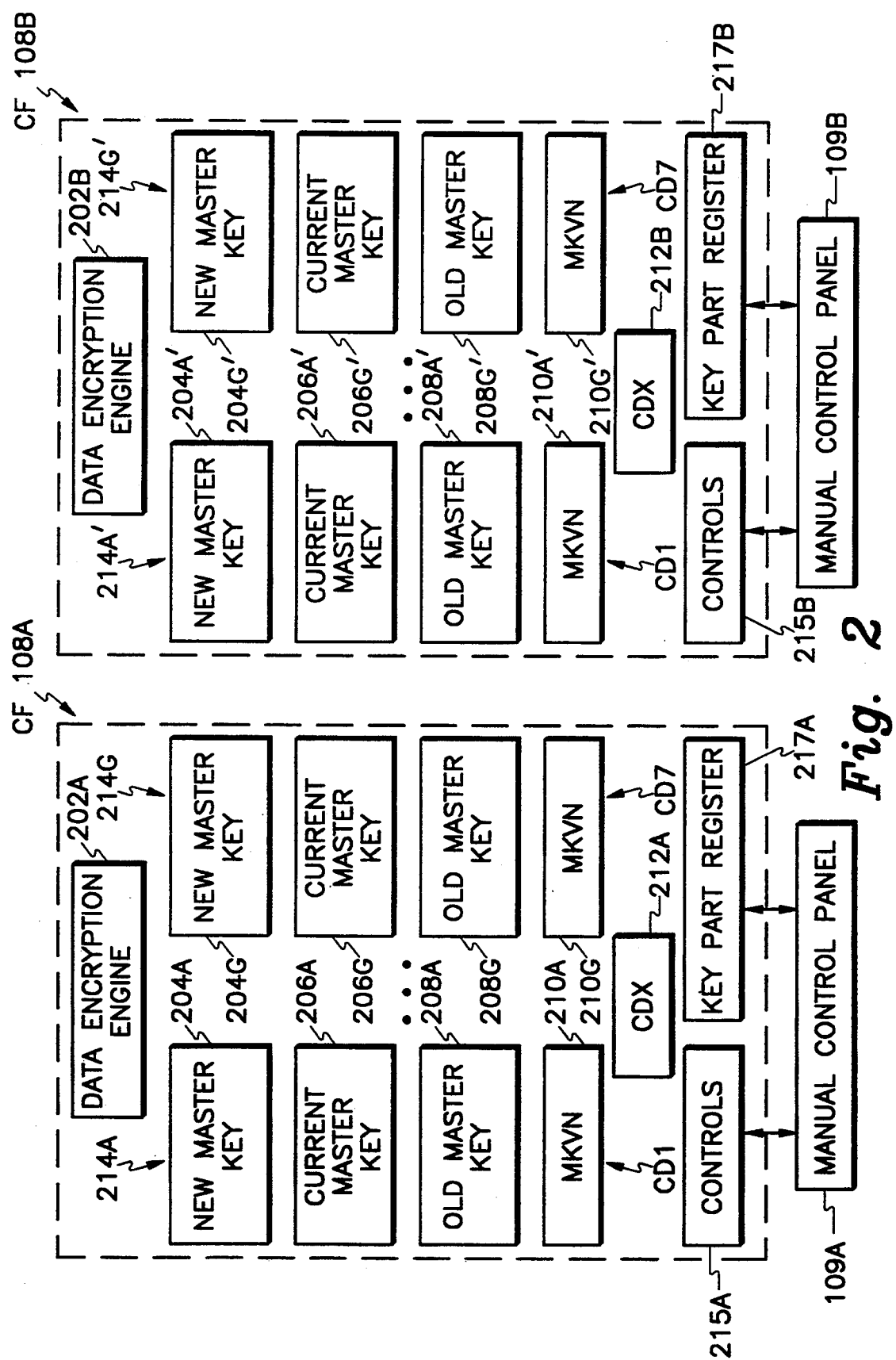
FIG. 2 illustrates a block diagram of cryptographic facilities (CF) 108.

The manual control panel 109 interfaces with the crypto facility 108 via controls 215 and a key-part register 217, as shown in FIG. 2.

Figure 1B:
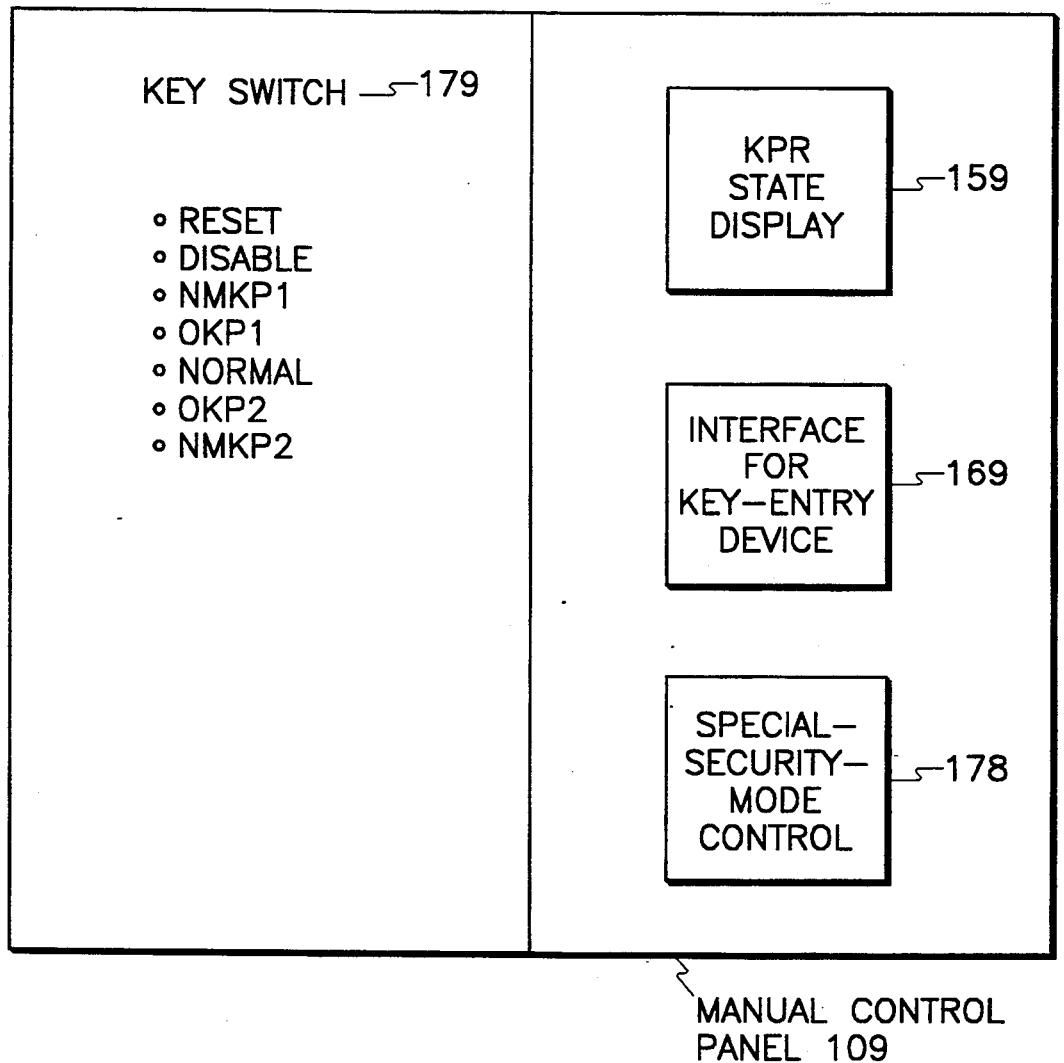
FIG. 1B illustrates a block diagram of manual-control panel 109.

Referring now to FIG. 1B, the panel 109 includes an interface 169 for attaching a key entry device, a key switch 179, a special-security-mode control 178, and a key-part-register state display 159.

The key-part register 217 (shown in FIG. 2) is used as a buffer for manually importing cryptographic keys from the external key entry device. The display 159 on the manual control panel 109 provides the visual feedback to the security officer required in the installation of key parts. The interface 169 allows a key-entry device to be attached for entering keys. The key switch 179 is provided for clearing secret quantities, disabling the crypto facility, and controlling the use of certain special cryptographic functions, including manual-key-entry functions.

The special-security-mode control 178 enables or disables a number of special crypto functions. When the control is on, a clear-key-import function and several clear-PIN-generation functions are enabled. Functions enabled by this control handle clear key or clear PIN (person identification number), and could be used by unauthorized users to subvert system security. These functions need special control.

A cryptographic key manually installed is entered by means of dual key entry, which requires the key to be split into two or more parts. Each part is separately imported, and the complete key is obtained by Exclusive ORing all the key parts.

The key switch 179 includes the following manual controls or positions:

Reset—While this control is on, a second reset control (not shown) is enabled which causes all secret quantities in the crypto facility to be set to zeros. This control consists of two physical switches to reduce the chance of accidental performance of the reset function.

Disable—While this control is on, all crypto functions are disabled.

Operational Key Part 1 (OKP1)—While this control is on, an import-key-part function is enabled for importing the first key part of an operational key. An operational key is any cryptographic key other than master keys.

Operational Key Part 2 (OKP2)—While this control is on, combine-intermediate-key-part and combine-final-key-part functions are enabled for importing the second or subsequent key part of an operational key.

New Master Key Part 1 (NMKP1)—While this control is on, a load-new-master-key-part function is enabled for importing the first key part of a new master key.

New Master Key Part 2 (NMKP2)— While this control is on, combine-intermediate-NMK-part and combine-final-NMK-part functions are enabled for importing the second or subsequent key part of a new master key.

Normal—While this control is on, the normal cryptographic functions are enabled.

2.2. Multiple Cryptographic Domains

Each cryptographic facility 108 of the present invention supports multiple cryptographic domains. In the preferred embodiment of the present invention, each cryptographic domain appears as a distinct CF 108 connected to the same physical CPU 106.

A guest CPU dispatched on a host CPU may have access to one or more cryptographic domains. At any particular time, however, a guest CPU dispatched on a host CPU may be operating in only a single cryptographic domain.

The cryptographic domains are defined by data retained within the CFs 108 and used during cryptographic operations. In this patent document, such data is called retained data. While the cryptographic domains may use the same physical CPU 106 and CF 108, the retained data used for cryptographic operations in a particular CF 108 are usually different for each cryptographic domain.

In the preferred embodiment of the present invention, each cryptographic domain is defined by the following retained data: current master key, master key version number (MKVN), new master key, and old master key.

The current master key associated with a cryptographic domain represents the master key which is currently being used by the cryptographic domain. The MKVN defines the version of the current master key.

The new master key and the old master key associated with a cryptographic domain are provided to support change of the current master key. To change the value of the current master key, the new master key is first assigned a new value. Once the new value is accepted, the current master key is stored as the old master key for archival purposes. Then, the new master key is stored as the current master key.

The manner in which the physical CPUs 106 and CFs 108 support multiple cryptographic domains is described below.

FIG. 2 illustrates a block diagram of the CFs 108. Each CF 108 contains a data encryption engine 202 for performing cryptographic functions, such as data encryption and decryption. The operation of the data encryption engine 202 is well known in the art.

Each CF 108 also contains register sets 214. The register sets 214 store the retained data. Thus, a one-to-one correspondence exists between the register sets 214 and the cryptographic domains. The number of register sets 214 which the CF 108 contains is equal to the maximum number of cryptographic domains which the CF 108 may support. In the preferred embodiment of the present invention, the CF 108 may support up to seven cryptographic domains. For reference purposes, these seven cryptographic domains are called cryptographic domains CD1, CD2, CD3, CD4, CD5, CD6, CD7. Thus, each CF 108 contains seven register sets 214A, 214B, 214C, 214D, 214E, 214F, 214G, which correspond to cryptographic domains CD1, CD2, CD3, CD4, CD5, CD6, CD7, respectively.

A correspondence exists between the register sets 214 in the two CFs 108A, 108B. Specifically, register sets 214A, 214A' contain retained data which are related to the cryptographic domain CD1. Likewise, register sets 214G, 214G' contain retained data which are related to the cryptographic domain CD7. However, the retained data in register sets 214A, 214A' do not always contain the same value. Similarly, the retained data in register sets 214G, 214G' do not always contain the same value. Specifically, if the manual control panels 109A and 109B have the same setting, then the CFs 108 may not be interchangeable with respect to cryptographic domain CD1 (if the retained data in register sets 214A, 214A' are different) but may be interchangeable, with respect to cryptographic domain CD7 (if the retained data in register sets 214G, 214G' are identical).

The register sets 214 each contain a new master key register 204, current master key register 206, old master key register 208, and MKVN register 210. These registers 204, 206, 208, 210 are used to store the new master key, current master key, old master key, and MKVN, respectively, associated with the retained data for the cryptographic domain.

As noted above, at any particular time, a guest CPU dispatched on a host CPU may be operating in only a single cryptographic domain. Therefore, at any particular time, only one of the register sets 214 in a particular CF 108 is active. Referring again to FIG. 2, each CF 108 contains a crypto domain index (CDX) register 212. The CDX register 212 in a CF 108 indicates the register set 214 which is currently active in the CF 108.

2.3. Program Controls

Figure 3:
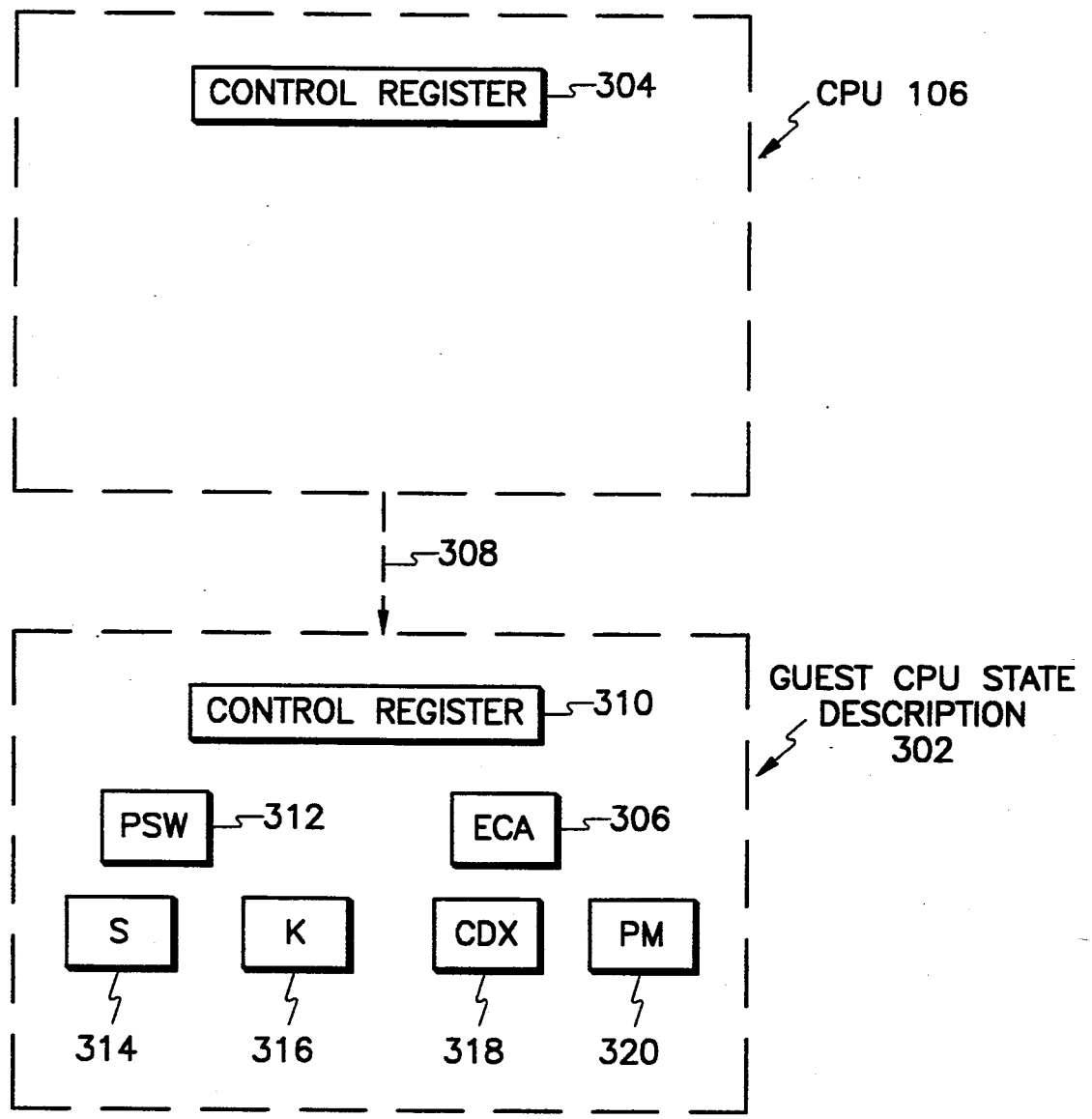
FIG. 3 illustrates a CPU 106 and a guest CPU state description 302.

Referring to FIG. 3, the CPUs 106 each contain a control register 304. The control register 304 (specifically, bit 29 of the control register 304) indicates whether the CPU 106 can process cryptographic instructions. In other words, the control register 304 indicates whether the CPU 106 is enabled or disabled for cryptographic operations.

FIG. 3 conceptually illustrates a guest CPU state description 302. A guest CPU state description 302 is associated with each guest CPU. The guest CPU state descriptions 302 indicate the manner in which the guest CPUs operate. The guest CPU state descriptions 302 are saved at the end of the guest CPUs' time-slices. The guest CPU state descriptions 302 are restored at the beginning of the guest CPUs' time-slices.

Each guest CPU state description 302 contains a control register 310. The control register 310 in the guest CPU state description 302 is similar to the control register 304 in the CPU 106, in that the control register 310 indicates whether the associated guest CPU is enabled for crypto instructions.

Thus, when a guest CPU issues a crypto instruction, the machine determines whether the guest CPU is enabled for crypto instructions by referring to the guest CPU's control register 310. If the guest CPU is not enabled, then the crypto instruction is not executed, instead a cryptographic operation exception is presented to the guest. If the guest CPU is enabled, then the machine determines whether the host CPU can process crypto instructions by referring to the host CPU's control register 304. If the host CPU is disabled or the host CPU does not have crypto then an interception is presented to the host.

If the host CPU does not have crypto, then the hypervisor 112 redispatches the guest CPU to a CPU 106A, 106B which can process crypto instructions.

If the host CPU has crypto and is disabled in host CPU's control register 304, then the hypervisor 112 redispatches the guest CPU on the same host CPU with control register 304 enabled for cryptographic operations.

If the host CPU has crypto, and is enabled in host CPU's control register 304 and guest CPU is enabled in guest control register 310 then the crypto instruction is performed, subject to the tests described in the next section.

2.4. Guest CPU State Description

Referring again to FIG. 3, each guest CPU state description 302 also contains a program status word (PSW) 312, a crypto special security mode (S) 314, a key-part-input mode control (K) 316, a crypto domain index (CDX) 318, ECA 306, and a passing mask (PM) 320.

The PSW 312 is well known to those skilled in the art.

The S bit 314 indicates whether the guest CPU can be enabled for the special-security mode. When the special-security-mode control 178 is on, the mode is enabled for the host CPU. This S bit allows logical partitions to be selectively enabled for the special-security mode. The special-security mode is enabled for a guest CPU only when the associated S bit 314 is one and the host CPU is enabled for the mode by means of the mode control 178 setting. When the special-security mode is not enabled for a guest CPU, if the guest CPU executes any special-security-mode function, the function is rejected by means of condition code 3 setting.

The K bit 316 indicates whether the guest CPU can perform manual-key-entry functions. These functions are listed as follows:

Enable Key Part Register
Disable Key Part Register
Load New master Key Part
Combine Final NMK Part
Combine Intermediate NMK Part
Import Key Part
Combine Intermediate Key Part
Combine Final Key Parts Unchanged
Combine Final Key Parts and Adjust Parity.

Each crypto facility only has one manual-control panel 109. The panel 109 is shared among all logical partitions. During manual-key-entry process, only one partition is authorized to use the manual-key-entry functions to prevent other partitions from stealing manually entered keys. The K bit 316 is provided to achieve this control. When the K bit 316 of a guest CPU is off, if the guest CPU executes any of the above functions, the function is rejected by means of condition code 3 setting.

The Passing Mask (PM) 320 indicates those cryptographic domains to which the guest CPU has access. The CDX 318 identifies the cryptographic domain in which the guest CPU is currently operating. The guest CPU can use the set-CDX-register function to select a domain authorized by the PM 320. If the selected domain is not authorized, the function is rejected. The guest CDX value 318 is loaded into the host CDX register 212 when the guest CPU is being dispatched on the host CPU.

2.5. Interception

The hypervisor 112 is informed when the CFs 108 are not interchangeable or when a non-interchangeable function is to be executed. The manner in which the hypervisor 112 is informed is described below.

2.5.1. PCCF

The hypervisor 112 is informed when any non-interchangeable function is to be performed by intercepting those functions. In the preferred embodiment of the present invention, such functions are called Perform Cryptographic Control Function (PCCF) instructions. The PCCF instructions are listed in Table 1.

TABLE 1

Enable Key Part Register
Disable Key Part Register
Clear NMK Register
Clear OMK Register
Set Master Key
Set MKVN Register
Load New Master Key Part TABLE 1-continued Combine Final NMK part
Combine Intermediate NMK Part
Generate VP for MK Register
Generate VP for NMK Register
Generate VP for OMK Register
Generate AP for NMK Register
Sense Crypto Status
Import Key Part
Combine Intermediate Key Part
Combine Final Key Parts Unchanged
Combine Final Key Parts and Adjust Parity The structure and operation of the PCCF instructions are apparent from their names. For example, a Set Master Key function sets a new master key for a cryptographic domain. A Set MKVN Register sets a MKVN register 210 in a CF 108.

As shown in FIG. 3, the state description 302 contains an execution control area (ECA) 306. Bit 15 of the ECA 306 controls whether the PCCF instructions are intercepted.

2.5.2. Condition Code 3

The PCCF instructions may change the state of the CFs 108 (that is, change the values of the retained data within the CFs 108). This may result in the CF 108 being not interchangeable.

The state of the CFs 108 may also asynchronously change. For example, one of the CFs 108 may be physically damaged such that the retained data within the damaged CF 108 changes.

In the preferred embodiment of the present invention, the condition code is set to 3 (during subsequent crypto instruction execution) to indicate when the state of the CFs 108 have been asynchronously changed.

Bit 14 of the ECA 306 controls whether the occurrence of condition code 3 (CC3) results in an interception. The hypervisor 112 detects whether the CFs 108 are interchangeable by monitoring the occurrence of the CC3 interceptions.

3. Operation of the Present Invention

As noted above, the hypervisor 112 dispatches the logical CPUs 116 on the physical CPUs 106. According to the present invention, the hypervisor 112 uses a scheduling method 402 to select a physical CPU 106 for a particular logical CPU 116. Once this selection is made, the hypervisor 112 then uses a dispatching mechanism to run the guest CPU 116 on the selected host CPU 106, and to turn the control over to the guest. The scheduling method 402 and the dispatching mechanism of the present invention are described in the following sections.

3.1 Dispatching

In the preferred embodiment of the present invention, the hypervisor 112 dispatches a logical CPU 116 on a physical CPU 106 by means of executing a special instruction, the START INTERPRETIVE EXECUTION (SIE) instruction. Execution of this instruction causes the physical CPU 106 to enter the guest mode and start executing the guest program according to the attributes in the state description.

When the host CPU exits the guest mode, the host program regains the control. Exiting the guest mode is done by exiting the SIE instruction, which can be caused by either an interception or interruption.

3.2. Scheduling

FIGS. 4-9 illustrate the scheduling method 402 of the present invention. The hypervisor 112 performs the scheduling method 402 in order to dispatch a logical CPU 116 on the physical CPUs 106 during the logical CPU's 116 time-slice.

The scheduling method 402 comprises three scheduling methods: disabled, affinity, and floating. Only one of these methods is active for a particular logical CPU 116. While the disabled scheduling method is active for a logical CPU 116 with crypto, the logical CPU 116 is not enabled for crypto instructions. Thus, the logical CPU 116 can be dispatched to any available physical CPU 106.

According to the affinity scheduling method, each logical CPU 116A, 116B, 116D, and 116E is assigned to a physical CPU 106A, 106B having crypto capability. The assigned physical CPUs 196A, 106B are called home CPUs. While the affinity scheduling method is active for a logical CPU 116, the logical CPU 116 is enabled for crypto instructions.

The affinity scheduling method is used when the CFs are not interchangeable or the guest attempts to issue noninterchangeable functions. The CFs 108 may not be interchangeable. Thus, the logical CPU 116 must be dispatched to its home CPU when the logical CPU 116 issues crypto instructions.

While the floating scheduling method is active for a logical CPU 116, the logical CPU 116 is enabled for crypto instructions. Also, the CFs 108 are interchangeable. Thus, the logical CPU 116 may be dispatched to any available physical CPU with a crypto facility 106A or 106B.

For illustrative purposes, the scheduling method 402 is described below using an example wherein the hypervisor 112 is dispatching the logical CPU 116A in the logical partition 114A on the physical CPUs 106. For the discussion assume that sufficient hardware components 104 are available to meet the needs of the logical CPU 116A.

The hypervisor 112 begins processing the scheduling method 402 for the logical CPU 116A by performing step 406. In step 406, the hypervisor 112 determines whether the disabled, affinity, or floating scheduling method is currently active for the logical CPU 116A. According to the present invention, the disabled scheduling method is always initially active. Therefore, in step 406 the hypervisor 112 determines that the disabled scheduling method is active for the logical CPU 116A and takes path B 408.

Figure 5:
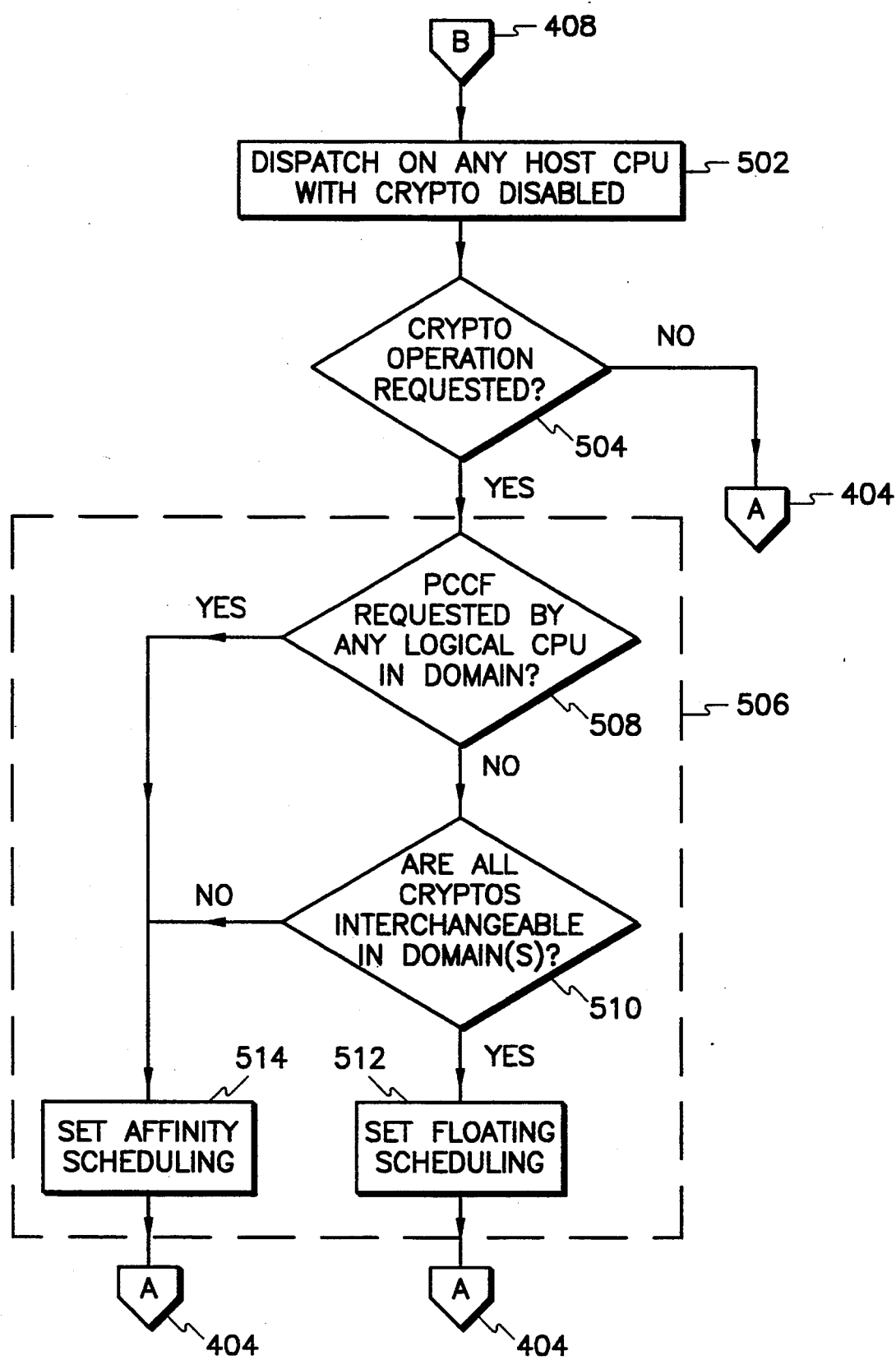

Referring now to FIG. 5, in step 502 the hypervisor 112 dispatches the logical CPU 116A to any available physical CPU 106. For illustrative purposes, assume that the hypervisor 112 dispatches the logical CPU 116A to the physical CPU 106D. As noted above, the guest CPU 116A has a guest CPU state description 302. During 502, the hypervisor 112 also sets the host control register 304 to indicate that the guest CPU 116A is not enabled for crypto instructions. Note that this does not mean that the guest CPU 116A is not allowed to issue crypto instructions.

Rather, this means that any crypto instructions issued by the guest CPU 116A will be intercepted by the hypervisor 112 before they are executed.

When the current dispatch of the logical CPU 116A is ended by the execution of a crypto instruction or by some other means such as guest time-slice end, step 504 is entered, in which the hypervisor 112 determines whether the logical CPU 116A requested a crypto instruction. If the logical CPU did not request a crypto instruction, then the hypervisor takes path A 404.

If the guest CPU 116A did request a crypto instruction, then the hypervisor 112 performs the steps in box 506. In step 508, the hypervisor 112 determines whether any PCCF instructions were requested by any guest CPUs operating in the cryptographic domains to which the guest CPU 116A has access. Referring to FIG. 2, suppose that the guest CPU 116A has access to cryptographic domain CD1 (that is, the cryptographic domain defined by the retained data stored in register sets 214A, 214A'). Also suppose that the logical CPU 116E has been dispatched to the physical CPU 106A, and is operating in cryptographic domain CD1. Thus, during step 508, the hypervisor 112 determines whether a PCCF instruction was requested by logical CPU 116E in cryptographic domain CD1.

If a PCCF instruction was requested by a logical CPU operating in the cryptographic domains to which the guest CPU 116A has access, then in step 514 the hypervisor 112 sets the affinity scheduling method to be active. Then the hypervisor 112 takes path A 404.

If a PCCF instruction was not requested by a guest CPU operating in the cryptographic domains to which the guest CPU 116A has access, then in step 510 the hypervisor 112 checks whether CFs 108 are interchangeable with regard to the cryptographic domains to which the guest CPU 116A has access. The manner in which the hypervisor 112 determines whether the CFs 108 are interchangeable is described below.

If the CFs 108 are interchangeable with regard to the cryptographic domains to which the guest CPU 116A has access, then in step 512 the hypervisor 112 sets the floating scheduling method to be active. Then the hypervisor 112 takes path A 404.

If the CFs 108 are not interchangeable with regard to the cryptographic domains to which the guest CPU 116A has access, then in step 514 the hypervisor 112 sets the affinity scheduling method to be active. Then the hypervisor 112 takes path A 404.

Suppose that the hypervisor 112 sets the affinity scheduling method to be active in step 514. Referring again to FIG. 4, in step 406 the hypervisor 112 would determine that the affinity scheduling method was active and process step 412.

Figure 9:
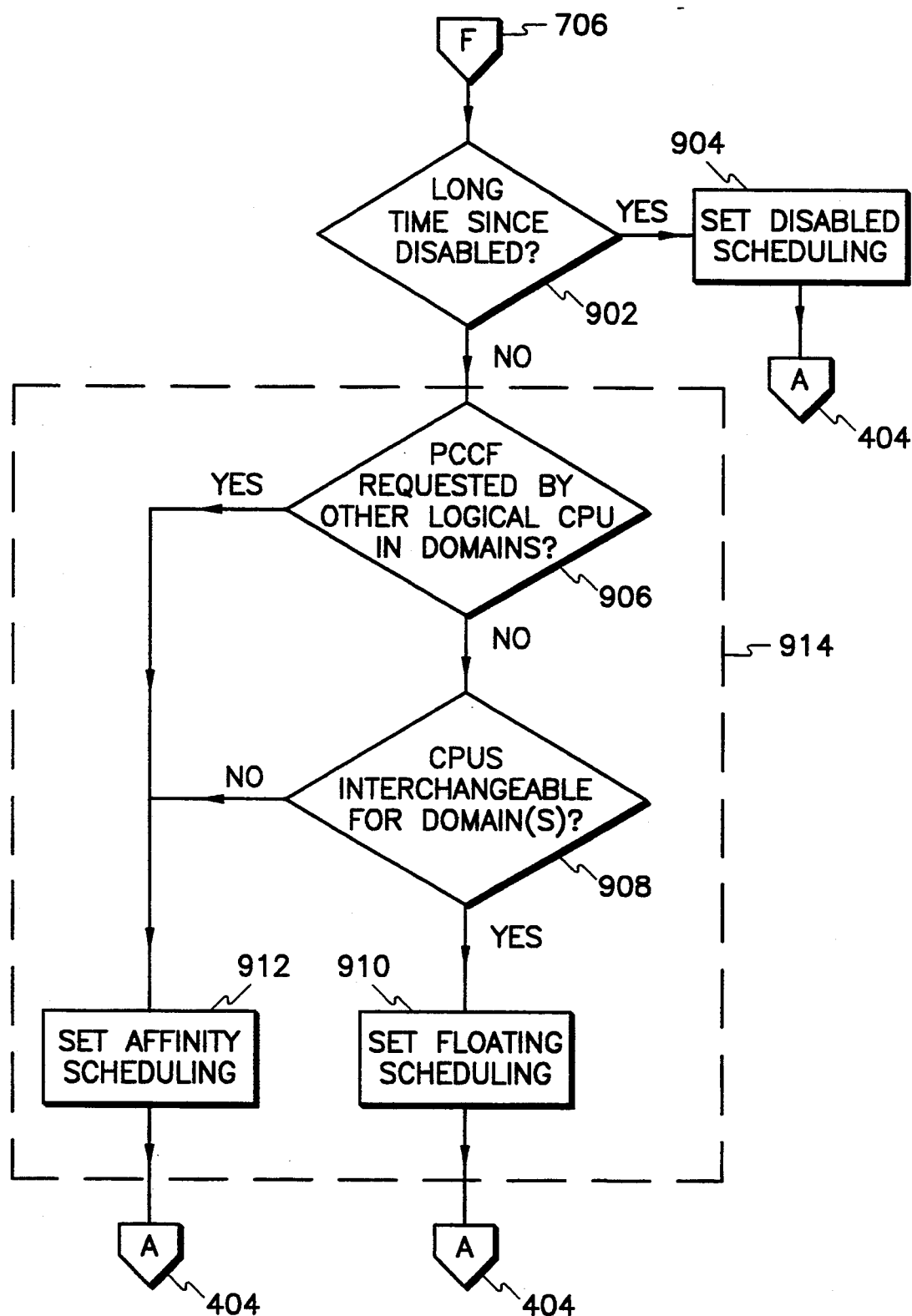

In step 412, hypervisor 112 determines whether the guest CPU 116A requested a PCCF instruction. If the guest CPU 116A did not request a PCCF instruction, then the hypervisor 112 takes path D 416 and step 702 is entered, in which the logical CPU 116A is dispatched on its home CPU. When the dispatch is ended, by some means such as guest time-slice end, the hypervisor 112 takes path F 706 and FIG. 9 is entered.

If step 412 indicates a PCCF instruction was requested by the guest CPU 116A, then step 414 is entered, in which the hypervisor 112 determines whether any other logical CPU (who is operating in the same cryptographic domains to which the guest CPU 116A has access) has the floating scheduling active (that is, the logical CPU is not dispatched on its respective home CPU). If another logical CPU has the floating scheduling active, then the hypervisor may alert the dispatcher to end the current dispatch of the other logical CPU for which the floating scheduling is in effect. This is done to discontinue floating scheduling on all logical CPUs.

Figure 7:
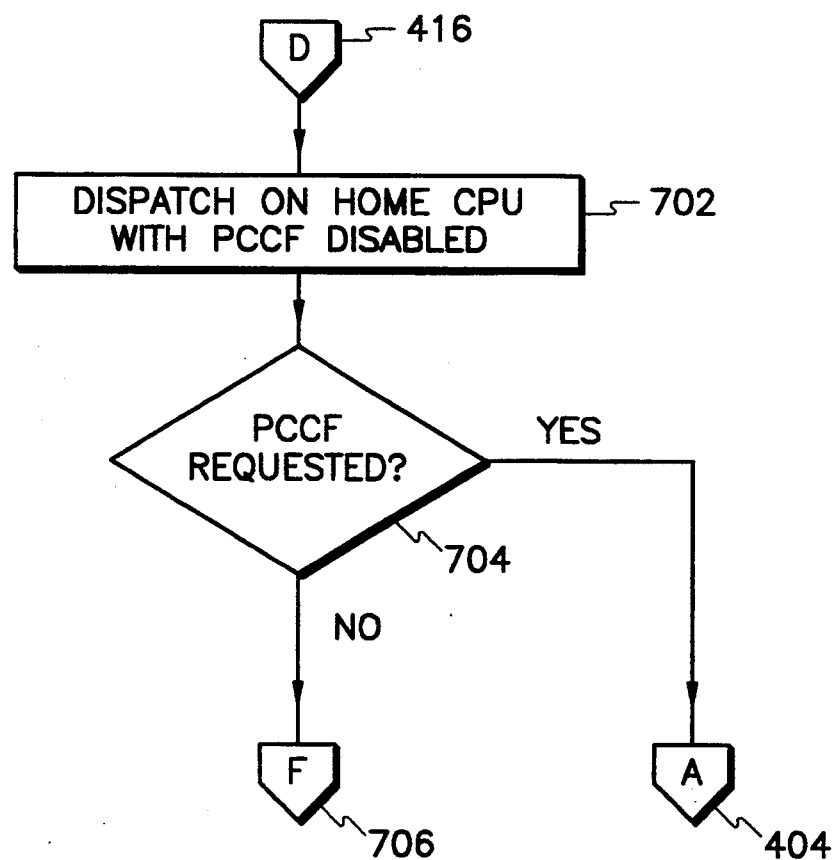

Referring now to FIG. 7, step 702 is entered from step 414 to dispatch the logical CPU 116A on its home CPU. The hypervisor 112 sets the ECA register 306 of the logical CPU 116A to indicate that PCCF instructions will be intercepted by hypervisor 112. This is done to defer the execution of the PCCF instruction by the logical CPU 116A until all other logical CPUs operating in the same cryptographic domain with the floating scheduling active have been alerted by the hypervisor 112 to end the current dispatch. The hypervisor 112 is essentially ensuring that no other logical CPU operating in the same cryptographic domain has the floating scheduling active while the retained data associated with the cryptographic domain is being changed by logical CPU 116A.

The next step 704 is entered to determine if a PCCF instruction was requested. Since a PCCF instruction was requested and the affinity scheduling is active, this process spins by returning to step 412 until step 414 determines that there is no other logical CPU that has the floating scheduling active. If no other logical CPU has the floating scheduling active, the hypervisor takes path E 418.

Referring now to FIG. 9, in step 902 the hypervisor 112 determines whether a significant amount of time has passed since the disabled scheduling method was active for the guest CPU 116A. If a significant amount of time has passed, then in step 904 the hypervisor 112 sets the disabled scheduling method to be active and takes path A 404. Essentially, in step 902 the hypervisor 112 is determining whether the guest CPU 116A is still issuing crypto instructions. If the guest CPU 116A is not issuing crypto instructions, then the hypervisor 112 may redispatch the guest CPU 116A to a physical CPU 106C, 106D, 106E, 106F that does not have crypto capabilities. This will permit the hypervisor to balance the workload with fewer restraints.

If, in step 902, a significant amount of time has not passed, then the hypervisor 112 performs the steps 906, 908, 910, 912 in box 914. The steps 906, 908, 910, 912 in box 914 are similar to the steps 508, 510, 512, 514 in box 506 (see FIG. 5). After performing the steps 906, 908, 910, 912 in box 914, the hypervisor 112 takes path A 404 after having activated either affinity scheduling or floating scheduling.

Referring again to FIG. 4, assume that, after processing steps 412 and 414 (steps 412 and 414 are described above), the hypervisor 112 takes path E 418, rather than path D 416.

Figure 8:
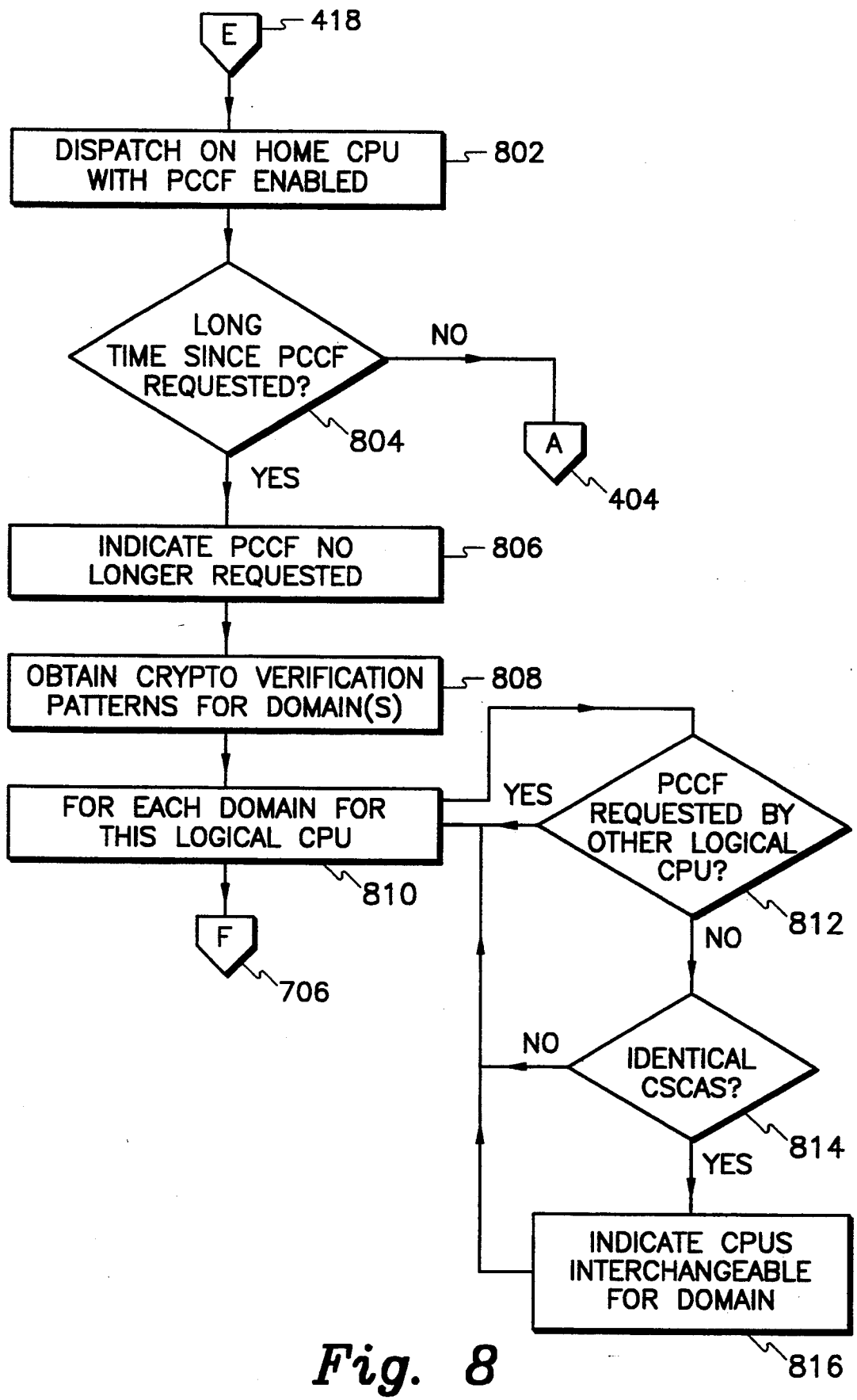

Referring now to FIG. 8, in step 802, the hypervisor 112 dispatches the guest CPU 116A on its home CPU. Recall that, according to our running example, the guest CPU's 116A home CPU is physical CPU 106B. During step 802, the hypervisor 112 also sets the ECA register 106 of the home CPU 106B to indicate that PCCF instructions will not be intercepted by the hypervisor 112. Thus, the guest CPU 116A may execute PCCF instructions without interception by the hypervisor 112.

Figure 4:
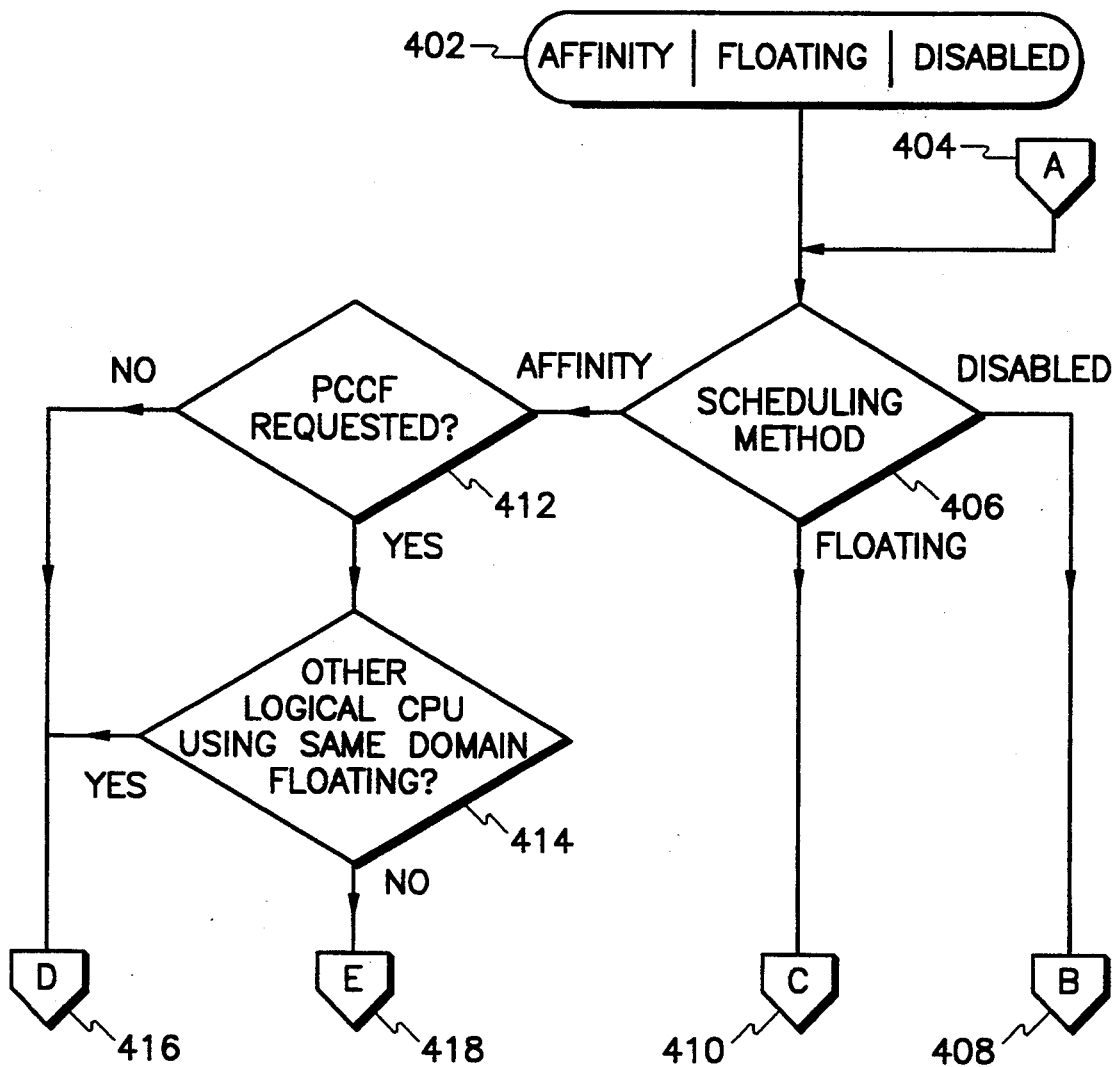
FIGS. 4–9 collectively illustrate a flowchart of a scheduling method 402 of the present invention.

In step 804, the hypervisor 112 determines whether a significant amount of time has passed since the last time the guest CPU 116A requested a PCCF instruction. If a significant amount of time has not passed, then the hypervisor 112 takes path A 404. Referring to FIG. 4, the hypervisor 112 would perform step 412 since the affinity scheduling is active.

If, in step 804, the hypervisor 112 determines that a significant amount of time has passed since the last time the guest CPU 116A requested a PCCF instruction, then in step 806 the hypervisor 112 indicates that the guest CPU 116A is no longer requesting PCCF instructions. The hypervisor 112 is essentially assuming that the guest CPU 116A no longer has a need to issue PCCF instructions.

In steps 808, 810, 812, 814, and 816, the hypervisor 112 determines whether the CFs 108 are interchangeable with respect to the cryptographic domains to which the guest CPU 116A has access. Conventionally, the hypervisor 112 would have to obtain the retained data in the register sets 214 to determine whether the CFs 108 were interchangeable. This is a problem since the retained data are secret. However, according to the present invention, the hypervisor 112 does not need to obtain the retained data in the register sets 214 to determine whether the CFs 108 are interchangeable.

According to the present invention, in step 808 the hypervisor 112 obtains verification patterns for the cryptographic domains to which the guest CPU 116A has access. The verification patterns are generated using the retained data in the CF 108B which is coupled to the guest CPU's 116A host. CPU 106B. Note that it is impractical to derive the value of the retained data from the verification pattern.

In order to obtain the verification patterns for the cryptographic domains to which the guest CPU 116A has access, the hypervisor 112 executes four functions: Generate Verification Pattern (VP) for Current Master Key register function, Generate VP for New Master Key register function, Generate VP for Old Master Key register function, and Sense Crypro Status function, respectively.

These four functions are executed for each cryptographic domain to which the guest CPU 116A has access (using the retained data associated with the cryptographic domains). Thus, a separate verification pattern set is produced for each cryptographic domain to which the guest CPU 116A has access.

The hypervisor 112 stores the verification pattern sets in a crypto-status compare area (CSCA) that is associated with the host CPU 106B. Each physical CPU 106A, 106B having cryptographic capability has a CSCA for storing verification pattern sets. The CSCA also includes other information on the CF state, such as the setting of the manual control panel and contents of the MKVN register. Information other than the verification patterns of a CF state is obtained by executing the Sense Crypto Status function on the CF.

Figure 10:
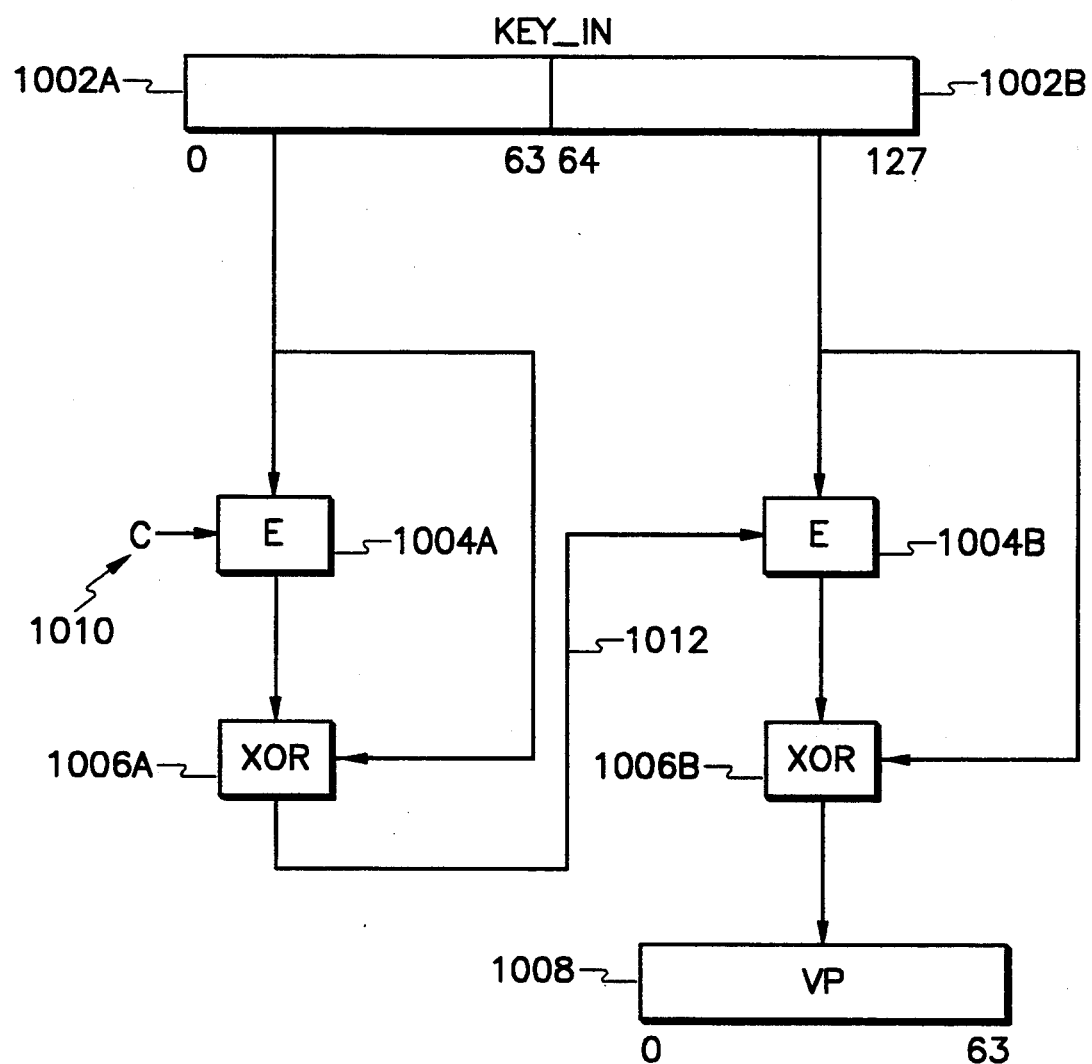
FIG. 10 illustrates a system for generating verification patterns.

FIG. 10 illustrates a system for performing the Generate VP for Current Master Key register function. The system in FIG. 10 contains a key_in register 1002, encryption devices 1004, exclusive-OR gates 1006, and a result register 1008.

Recall that, during step 808, the hypervisor 112 is performing the Generate VP for Current Master Key register function on CPU 106B (that is, the guest CPU's 116A home CPU) having CF 108B. Assume that the guest CPU 116A has access to the cryptographic domain CD1 defined by the retained data in register set 214A'.

To perform the Generate VP for Current Master Key register function, the current master key in the current master key register 206A' is transferred to the key_in register 1002. In the preferred embodiment of the present invention, the current master key is z128 bits. Note that the hypervisor 112 does not have direct access to the current master key in the current master key register 206C.

Bits 0 through 63 of the current master key are encrypted in the encryption device 1004A using a key 1010. The operation of the encryption device 1004A is well known to those skilled in the art. In the preferred embodiment of the present invention, the key 1010 equals 4545454545454545 (hexidecimal).

The output of the encryption device 1004A is exclusive-OR'ed with bits 0 through 63 of the current master key in the exclusive-OR gate 1006A.

Bits 64 through 127 of the current master key are encrypted in the encryption device 1004B using the output 1012 of the exclusive-OR gate 1006A as a key. The output of the encryption device 1004B is exclusive-OR'ed with bits 64 through 127 of the current master key in the exclusive-OR gate 1006B.

The output of the exclusive-OR gate 1006B represents the output of the Generate VP for Current Master Key register function and is stored in the result register 1008.

The contents of the result register 1008 represents a verification pattern for the current master key. This verification pattern, which is not secret, is a reflection of the current master key and can be used to determine whether the CFs 108 (with regard to the cryptographic domains to which the guest CPU has access) are interchangeable. However, this verification pattern cannot be used to determine the value of the current master key.

The system in FIG. 10 is also used to implement the Generate VP for New Master Key register function and Generate VP for Old Master Key register function. For the Generate VP for New Master Key register function, the contents of the new master key register 204A' are transferred to the key_in register 1002. For the Generate VP for Old Master Key register function, the contents of the old master key register 208A' are transferred to the key_in register 1002.

The Sense Crypro Status function returns cryptographic-related information, including information contained in the guest CPU state description 302 for the guest CPU 116A. The result of this function performed on a CF is also placed in the CSCA of the CF.

After performing step 808 in FIG. 8, wherein the hypervisor 112 obtained verification patterns for the cryptographic domains to which the guest CPU 116A has access, the hypervisor 112 performs step 810.

According to step 810, the hypervisor 112 performs steps 812, 814, and 816 for each of the cryptographic domains to which the guest CPU 116A has access. Thus, in step 810, the hypervisor 112 sequentially selects one of the cryptographic domains to which the guest CPU 116A has access. Once all the cryptographic domains have been selected, the hypervisor 112 takes path F 706. Recall that, according to our running example, the guest CPU 116A has access to cryptographic domain CD1. Thus, in step 810, the hypervisor 112 selects cryptographic domain CD1.

In step 812, the hypervisor 112 determines whether any PCCF instructions were requested by any guest CPUs operating in the cryptographic domain CD1. Step 812 is similar to step 508. In step 812 the hypervisor 112 is essentially determining whether the retained data associated with the cryptographic domain CD1 (that is, the data stored in register sets 214A and 214A') is being changed by any logical CPU 116.

If PCCF instructions were requested, then the retained data associated with the cryptographic domain CD1 may be changing. Thus, at this time, the hypervisor 112 cannot determine whether the CFs 108 (with regard to cryptographic domain CD1) are interchangeable. Therefore, the hypervisor 112 returns to step 810. Since all the cryptographic domains to which the hypervisor 112 has access have been selected, the hypervisor 112 takes path F 706. Note that the hypervisor 112 has not indicated that the CFs 108 (with regard to cryptographic domain CD1) are interchangeable.

If PCCF instructions were not requested, then in step 814 the hypervisor 112 compares the crypto status compare areas (CSCAs) associated with the cryptographic domain CD1. Specifically, the hypervisor 112 compares two sets of CSCAs, wherein the first set is associated with the CF 108A and the second set is associated with the CF 108B.

If the CSCAs are identical, then in step 816 the hypervisor 112 indicates that the CFs 108 (with regard to the cryptographic domain CD1) are interchangeable. Then the hypervisor 112 goes to step 810.

If the CSCAs are not identical, then the hypervisor 112 goes directly to step 810. Note that the hypervisor 112 has not indicated that the CFs 108 (with regard to cryptographic domain CD1) are interchangeable.

In step 810, since all the cryptographic domains to which the hypervisor 112 has access have been selected, the hypervisor 112 takes path F 706. Path F 706 was described above.

Referring again to FIG. 4, the hypervisor 112 goes to step 406 and determines whether disabled, affinity, or floating are activated. The operation of the scheduling method 402 when disabled or affinity is activated has been described above. Thus, assume that floating is activated when the hypervisor 112 performs step 406. If this is the case, then the hypervisor 112 takes path C 410.

Figure 6:
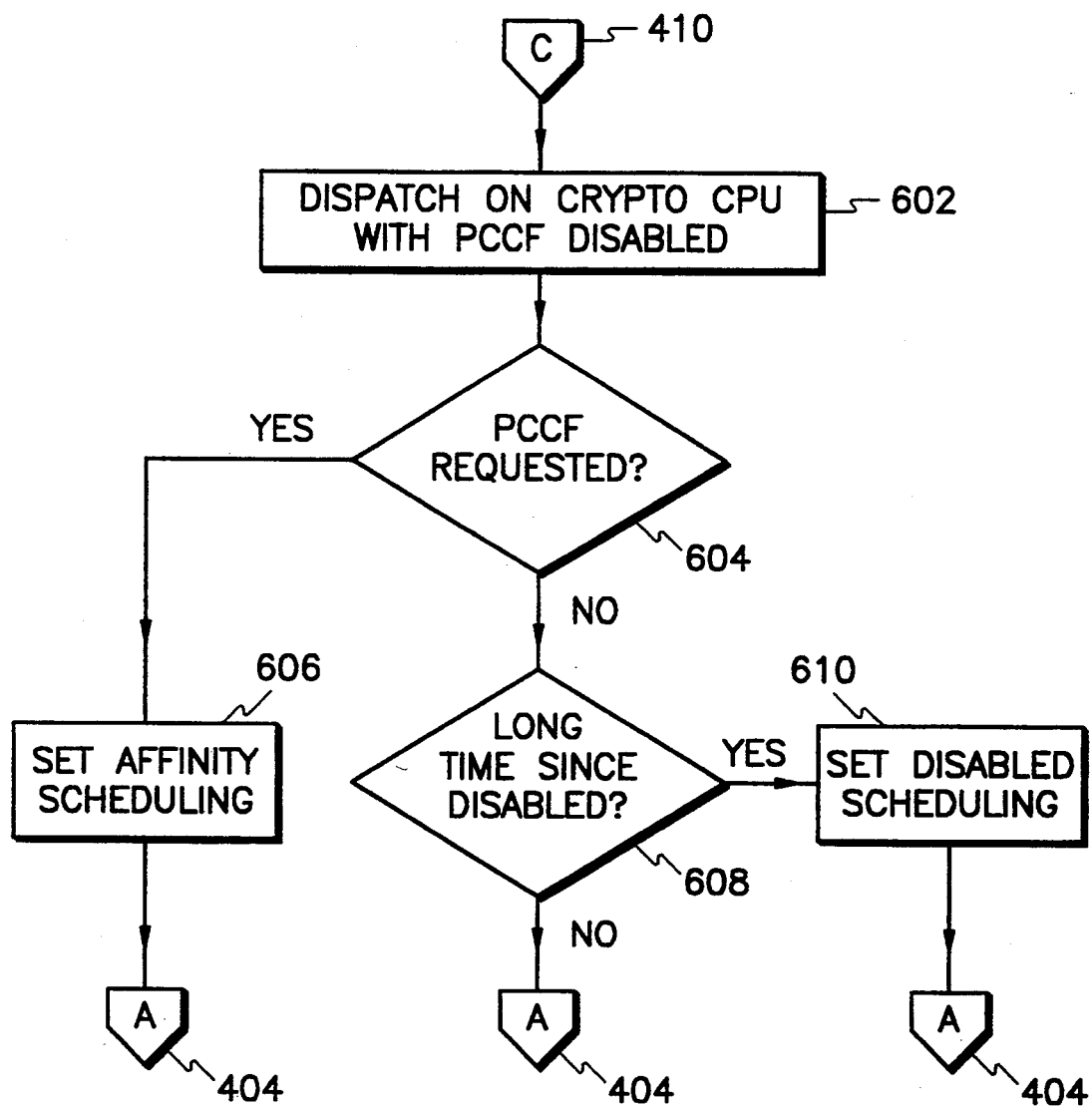

Referring now to FIG. 6, in step 602 the hypervisor 112 dispatches the guest CPU 116A on any available physical CPU 106A, 106B having crypto capabilities. For illustrative purposes, suppose that the hypervisor 112 dispatches the guest CPU 116A to the physical CPU 106B. During step 602, the hypervisor 112 also sets the ECA register 106 of the host CPU 106B to indicate that PCCF instructions will be intercepted by the hypervisor 112.

In step 604, the hypervisor 112 determines whether a PCCF instruction was, requested by the guest CPU 116A.

If a PCCF instruction was requested, then in step 606 the hypervisor 112 sets affinity scheduling to be active and takes path A 404.

If a PCCF instructions was not requested, then in step 608 the hypervisor 112 determines whether a significant amount of time has passed since the disabled scheduling method was active for the guest CPU 116A. Step 608 is similar to step 902.

If a significant amount of time has passed, then in step 610 the hypervisor 112 sets the disabled scheduling method to be active and takes path A 404. If a significant amount of time has not passed, then the hypervisor 112 takes path A 404.

Figure 11:
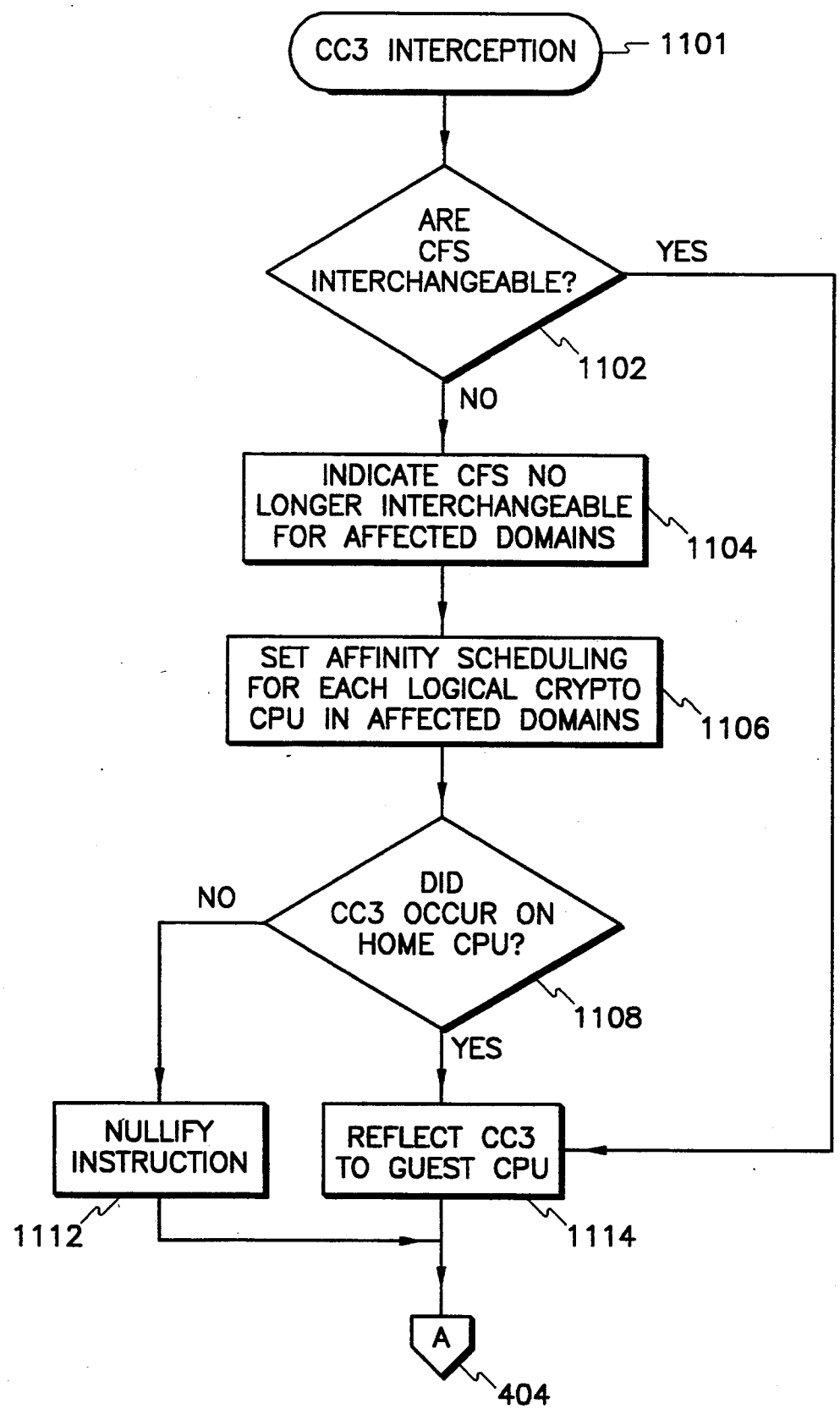
FIG. 11 illustrates the manner in which the present invention processes CC3 interceptions.

Referring to FIG. 11, in step 1101, the hypervisor 112 gains control due to an CC3 interception. In step 1102, the hypervisor 112 tests to see if the CFs 108A and 108B are no longer interchangeable. If the CFs are interchangeable then step 1114 is taken, which reflects the condition code 3 to the guest. If the CFs are not interchangeable, then step 1104 is taken. In step 1104, the hypervisor sets a non-interchangeable indication for all domains. In step 1106, the hypervisor 112 sets affinity scheduling for each logical crypto CPU in all logical partitions. In step 1108, the hypervisor tests to see if the CC3 occurred on the home CPU. If the CC3 occurred on the home CPU, then step 1114 is taken, which reflects the condition code 3 to the guest. If, in step 1108, the CC3 did not occur on the home CPU, then step 1112 is executed, which nullifies the instruction and then takes path A 404.

3.3 Two Levels of Guest

In an embodiment of the present invention, the scheduling method 402 described previously is extended to allow handling two levels of guest. More specifically, while a crypto guest (guest 2) is running under VM (guest 1) which is running under VM or PR/SM (host), the same sched uling method 402 can be used by both the host and guest 1.

The following summarizes this extension of the present invention:

(1) A guest-2 CPU is enabled for normal crypto instructions only if the guest-2 CPU's control register 310, the guest-1 CPU's control register 310, and the host CPU's control register 304 are all set to enable the crypto facility. If a guest-2 CPU is not enabled for crypto and a crypto instruction is executed by the guest-2 CPU, an interception or interruption for the crypto-operation exception is recognized, as explained in item 4.

(2) A guest-2 CPU is enabled for the special-security mode only if the S bits for guest-1 and guest-2 CPUs are both one, and the host CPU is also enabled for the mode by means of the manual mode control 178 setting. If a guest-2 CPU is not enabled for the mode and a special-security mode function is performed by the guest-2 CPU, a CC3 is set to the guest-2 CPU or an interception for CC3 is recognized, as explained in item 4.

(3) A guest-2 CPU is enabled for the manual-key-entry functions only if the K bits for the guest-1 and guest-2 CPUs are both ones. If a guest-2 CPU is not enabled for those functions and any of those functions is performed by the guest-2 CPU, a CC3 is set to the guest-2 CPU or an interception for CC3 is recognized, as explained in item 4.

(4) Interception controls for PCCF, CC3, or crypto-operation interruption are defined as follows:
  (a) Program control is given to the guest-1 CPU if the CPU specifies to intercept the event through guest-2 ECA or interception controls, independent of how the host CPU specifies the guest-1 ECA or interception controls.
  (b) Program control is given to the host CPU if the guest-1 CPU specifies not to intercept the event, but the host CPU specifies to do so.
  (c) The PCCF function is performed in the guest-2 CPU, CC3 is presented to the guest-2 CPU, or the crypro-operation interruption is presented to the guest-2 CPU if both the guest-1 and the host CPUs specify not to intercept the corresponding event.

When all crypro facilities are interchangeable and for guest 2 interchangeable crypto functions, both the host and guest 1 can float their crypto guests.

When crypto facilities become non-interchangeable or for guest 2 non-interchangeable functions, the guest-2 CPU must be running on a specific host CPU. This is achieved by first re-dispatching guest-2 CPUs on their home CPUs at guest 1 level using the CC3 or PCCF interception as the detection mechanism. The guest 1 is now disabled for the CC3 or PCCF interception. When the CC3 or PCCF interception occurs again because of re-execution of the same function in guest 2, the control is given directly to the host CPU. The host then re-dispatches guest-1 CPUs to their home CPUs and also disables the CC3 or PCCF interception. This time, when the same function is performed again, guest-1 and guest-2 CPUs are all running on their home CPUs.

Special terms which are used in the claims are listed and defined below. These special terms are supported by and consistent with the above description of the present invention.

The term "task" denotes either a guest CPU running in a guest/host environment or an application program running in an operating system environment.

The term "scheduler" denotes a scheduling mechanism which manages the selection and dispatching of tasks. The scheduler may be either a control program such as a hypervisor or operating system, or a hardware mechanism.

The term "dispatching mechanism" denotes those instructions or functions used by the scheduler to cause the state associated with the task to be loaded into the physical processor and to cause actual processing of instructions for the task to be initiated. The term "dispatching" without the term "mechanism" is used to denote the action taken by the scheduler to invoke the dispatching mechanism.

The term NIF (normally interchangeable facility) is used to denote a unit, such as a cryptographic facility, which has the following qualities:
1. The NIF attaches to a processor.
2. The NIF has some portion of its internal state called "non-restorable state information" which cannot be restored by the scheduler. When the non-restorable state information is the same on two NIFs, the NIFs are said to be "interchangeable." In normal operation, the NIFs are interchangeable.
3. The NIF has functions which can be executed by a task. When the NIFs are not interchangeable there is a particular physical NIF, called the "home" NIF, on which the task must run.
4. The NIF's functions most frequently used by the task are a group of functions called "physical-unit independent" (PUI) functions, which produce identical results on different NIFs when the NIFs are interchangeable. Thus, in normal situations, the task can run on more than one NIF in the configuration and can execute PUI functions without the task being aware of which NIF was used.
5. The NIF may have certain functions, called "physical-unit dependent" (PUD) functions which can be executed by the task and which must always be run on the home NIF for the task. A function may be dependent on a particular physical unit either because it may produce different results on different NIFs, even in normal situations, or it may change the non-restorable state information in the NIF. PUD functions which change the non-restorable state information in the NIF are called "invasive" PUD functions.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. In a data processing system comprising multiple processors and a scheduler, wherein multiple tasks operate in the data processing system, a computer based apparatus comprising:
   (1) two or more normally interchangeable facilities (NIFs) each electrically coupled to one of the processors, each of said NIFs being a home NIF for one of said tasks wherein a task must be re-dispatched to its home NIF from operation on another NIF when its home NIF becomes distinctive relative to all other NIFs, each of said NIFs comprising non-restorable state information and providing NIF functions which are executable by tasks, said NIF functions comprising physical-unit independent (PUI) functions which produce identical results on any of said NIFs when said NIFs are interchangeable;
   (2) verification means for indicating to the scheduler whether said NIFs are interchangeable;
   (3) notification means for alerting the scheduler when one of said NIFs becomes no longer interchangeable; and
   (4) dispatching means, coupled to the scheduler, for dispatching a task in a first mode or a second mode, wherein dispatchment in said first mode permits said task to execute said NIF functions and dispatchment in said second mode does not permit said task to execute said NIF functions.

2. The apparatus of claim 1, further comprising means for alerting the scheduler if said task attempts to execute one of said NIF functions while in said second mode.

3. The apparatus of claim 1, wherein said NIFs comprise secret data and wherein said verification means comprises means for generating verification patterns using said secret data without disclosing said secret data, wherein said verification patterns are not secret.

4. The apparatus of claim 3, wherein said NIFs are cryptographic facilities.

5. The apparatus of claim 1, wherein said notification means comprises means for indicating to the scheduler when a subsequent function is executed by a task.

6. The apparatus of claim 1, wherein said notification means comprises an asynchronous interruption.

7. The apparatus of claim 1, wherein said NIFs comprise multiple domains.

8. The apparatus of claim 7, said apparatus further comprising means for identifying a subset of said domains for which said task is enabled to use.

9. The apparatus of claim 8, said apparatus further comprising means for indicating a current domain in which said task is operating, wherein said current domain represents one of said domains in said subset.

10. The apparatus of claim 1, wherein said NIFs comprise manual data entry means.

11. The apparatus of claim 10, further comprising special functions by which said task has access to said manual data entry means.

12. The apparatus of claim 11, further comprising means for controlling whether said task is enabled to issue said special functions.

13. The apparatus of claim 12, wherein said controlling means comprises physical enablement means, coupled to said manual data entry means, and logical enablement control means.

14. The apparatus of claim 13, further comprising means for combining said physical and logical enablement control means to control whether said task is enabled to issue said special functions.

15. In a data processing system comprising multiple processors and a scheduler, wherein multiple tasks operate in the data processing system, a computer based apparatus comprising:
   (1) two or more normally interchangeable facilities (NIFs) each electrically coupled to one of the processors, each of said NIFs being a home NIF for one of said tasks wherein a task must be re-dispatched to its home NIF from operation on another NIF when its home NIF becomes distinctive relative to all other NIFs, each of said NIFs comprising non-restorable state information and providing NIF functions which are executable by tasks, said NIF functions comprising physical-unit independent (PUI) functions and physical-unit dependent (PUD) functions, wherein said PUI functions produce identical results on any of said NIFs when said NIFs are interchangeable, and wherein said PUD functions produce varying results when executed using different NIFs;
   (2) verification means for indicating to the scheduler whether said NIFs are interchangeable;
   (3) notification means for alerting the scheduler when one of said NIFs becomes no longer interchangeable; and
   (4) dispatching means, coupled to the scheduler, for dispatching a task in a first mode, a second mode, or a third mode, wherein dispatchment in said first mode permits said task to execute said NIF functions, dispatchment in said second mode does not permit said task to execute said NIF functions, and dispatch merit in said third mode permits said task to execute said PUI functions but not said PUD functions.

16. The apparatus of claim 15, further comprising means for alerting the scheduler if said task attempts to execute one of said NIF functions while in said second mode.

17. The apparatus of claim 15, further comprising means for alerting the scheduler if said task attempts to execute one of said PUD functions while in said third mode.

18. The apparatus of claim 15, wherein said NIFs comprise secret data and wherein said verification means comprises means for generating verification patterns using said secret data without disclosing said secret data, wherein said verification patterns are not secret.

19. The apparatus of claim 18, wherein said NIFs are cryptographic facilities.

20. The apparatus of claim 15, wherein said notification means comprises means for indicating to the scheduler when a subsequent function is executed by a task.

21. The apparatus of claim 15, wherein said notification means comprises an asynchronous interruption.

22. The apparatus of claim 15, wherein said NIFs comprise multiple domains.

23. The apparatus of claim 22, further comprising means for identifying a subset of said domains for which said task is enabled to use.

24. The apparatus of claim 23, further comprising means for indicating a current domain in which said task is operating, wherein said current domain represents one of said domains in said subset.

25. The apparatus of claim 15, wherein said NIFs comprise manual data entry means.

26. The apparatus of claim 25, further comprising special functions by which said task has access to said manual data entry means.

27. The apparatus of claim 26, further comprising means for controlling whether said task is enabled to issue said special functions.

28. The apparatus of claim 27, wherein said controlling means comprises physical enablement means, coupled to said manual data entry means, and logical enablement control means.

29. The apparatus of claim 28, further comprising means for combining said physical and logical enablement control means to control whether said task is enabled to issue said special functions.

30. In a data processing system comprising processors, normally interchangeable facilities (NIFs) each coupled to one of the processors and providing NIF functions, comprising physical-unit independent (PUI) functions and physical-unit dependent (PUD) functions, wherein said PUI functions produce identical results on any of said NIFs when said NIFs are interchangeable, and wherein said PUD functions produce varying results when executed using different NIFs, the data processing system further comprising tasks which use the NIFs, and a scheduler, a computer implemented method for scheduling and dispatching one of the tasks to the processors said computer implemented method comprising the steps of:
   (a) assigning a home processor to the task, wherein said home processor is one of the processors coupled to one of the NIFs, and wherein the task must be re-dispatched to its home processor from operation on another processor when its home processor becomes distinctive relative to all other processors;
   (b) activating a first, second, or third scheduling mode for the task;
   (c) dispatching the task to any of the processors when said first scheduling mode is active;
   (d) dispatching the task to any of the processors coupled to the NIFs when said second scheduling mode is active; and
   (e) dispatching the task to said home processor when said third scheduling mode is active.

31. The method of claim 30, wherein the activating step comprises the step of determining whether the NIFs are interchangeable.

32. The method of claim 31, wherein the step of determining whether the NIFs are interchangeable comprises the steps of:
   (1) generating verification patterns;
   (2) comparing said verification patterns;
   (3) indicating that the NIFs are interchangeable when said verification patterns are equal; and
   (4) indicating that the NIFs are not interchangeable when said verification patterns are not equal.

33. The method of claim 30, wherein the activating step comprises the steps of:

(1) activating said first scheduling mode when the task has not executed any of the NIF functions for some period of time;

(2) activating said second scheduling mode when the task issues one of the physical-unit independent (PUI) functions and the NIFs are interchangeable; and (3) activating said third scheduling mode when the task issues one of the NIF functions and the NIFs are not interchangeable or when the task issues one of the physical-unit dependent (PUD) functions.

34. The method of claim 33, wherein the activating step further comprises the step of:

(4) activating said second scheduling mode when said third scheduling mode is active for the task and the NIFs become interchangeable.

35. The method of claim 30, wherein said step for dispatching the task to any of the processors when said first scheduling mode is active comprises the steps of:

(1) dispatching the task to any one of the processors; and (2) setting a control means such that the task is disabled for all the NIF functions.

36. The method of claim 30, wherein said step for dispatching the task to any of the processors coupled to the NIFs when said second scheduling mode is active comprises the steps of:

(1) dispatching the task to any of the processors coupled to one of the NIFs; and (2) setting a control means such that the task is enabled to issue the PUI functions, but not enabled to issue the PUD functions.

37. The method of claim 30, wherein said step for dispatching the task to said home processor when said third scheduling mode is active comprises the steps of:

(1) dispatching the task to said home processor; and (2) setting a control means such that the task is enabled to issue the PUI and PUD functions.

38. The method of claim 30, wherein the activating step comprises the step of activating said third scheduling mode when the task issues any of the NIF functions and the NIFs are not interchangeable or when the task issues a non-invasive PUD function.

39. The method of claim 38, wherein said step for dispatching the task to said home processor when said third scheduling mode is active comprises the steps of:

(1) dispatching the task to said home processor; and (2) setting a control means such that the task is enabled to issue the PUI and non-invasive PUD functions, but disabled to issue invasive PUD functions.

40. The method of claim 30, wherein the activating step comprises the step of activating said third scheduling mode when the task issues an invasive PUD function.

41. The method of claim 40, wherein said step for dispatching the task to said home processor when said third scheduling mode is active comprises the steps of:

(1) dispatching the task to said home processor; and (2) setting a control means such that the task is enabled to issue all of the NIF functions.

42. The method of claim 30, wherein the NIF is a cryptographic facility.

* * * * *